Sept. 20, 1971  LEE ROY BROWN  3,606,127

TRANSPORT SYSTEM

Filed Jan. 15, 1969  2 Sheets-Sheet 1

INVENTOR
LEE ROY BROWN

BY  Frank S. Troidl
ATTORNEY

Sept. 20, 1971     LEE ROY BROWN     3,606,127

TRANSPORT SYSTEM

Filed Jan. 15, 1969     2 Sheets-Sheet 2

INVENTOR
LEE ROY BROWN

BY Frank S. Troidl

ATTORNEY

United States Patent Office 3,606,127
Patented Sept. 20, 1971

3,606,127
TRANSPORT SYSTEM
Lee Roy Brown, Houston, Tex., assignor to Image
Information Inc., South Norwalk, Conn.
Filed Jan. 15, 1969, Ser. No. 791,217
Int. Cl. B65h *17/20*
U.S. Cl. 226—190                                          4 Claims

ABSTRACT OF THE DISCLOSURE

This disclosure is of a high speed data plotter system. The data plotter system uses modulated laser light to scan photographic film. The system includes means for driving the photographic film, and a pair of guide rollers with helices which frictionally engage the moving photographic film. The helices are made of a material having a high coefficient of friction relative to the coefficient of friction of the photographic film. The guide rollers help to maintain the fast moving film taut and true in position during the scanning.

BACKGROUND OF THE INVENTION

This invention relates to apparatus for accurately guiding and positioning continuous flexible webs of thin materials. More particularly, this invention is a new photosensitive medium transporting device for use with high speed data plotter systems.

Recently computers capable of handling vast quantities of data at extremely rapid rates have become available. It is desirable to plot certain data in graphic visual form at full computer speed. Such plotters have been developed and some of these plotters use a laser light source modulated in intensity in accordance with the data received from the computer.

Since a laser light source modulated type system scans a photographic film at an extremely rapid rate, it is absolutely necessary that the photographic film transporting portion of this system move the photographic film past the scanning area at extremely rapid incremental indexed steps. These extremely rapid indexed steps must also be very accurate. As an example, the problem the present invention solves relates to the movement of photographic film in extremely accurate incremental indexed steps of .005 inch over long lengths of film. This indexing must be done while maintaining an accurate reference to the edge of the film for providing an accurately square plot.

SUMMARY OF THE INVENTION

The new transport system includes means for feeding a continuous flexible sheet of material to a rotatable member, such as a rotatable drum. Also included in the system are guide rollers. Each guide roller has a helix formed thereon. The helix is made of a material having a high coefficient of friction relative to the coefficient of friction of the continuous flexible sheet of material. Means are provided for moving the guide rollers so that the helices frictionally engage the moving flexible sheet of thin material. The pitch of each helix and the clockwise or counterclockwise spiral of the helix formed on individual guide rollers are carefully chosen so that each helix exerts a predetermined transverse force on the sheet of material as the material is moved through the required path and around the rotatable drum. The resulting equilibrium maintains the material along a true path without crimps or bends.

This invention is an improvement of the invention disclosed in application Ser. No. 738,258, filed June 19, 1968, for "Transport System" by Jack R. Anthony and assigned to the assignee of the present invention. A particular advantage of the invention is that the guide rollers are mounted with their axes perpendicular to the direction of movement of the sheet of material.

DESCRIPTION OF A PREFERRED EMBODIMENT

A high speed data plotter system with which the present inventive structure is uniquely adapted to operate includes a completely computer-controlled system wherein the plotter acts in an on-line capacity, plotting each line of image information while computing continues for subsequent lines. Additional information on such data plotter systems may be found in United States Pat. No. 3,389,403 issued to J. M. Cottingham et al. on June 18, 1968.

Figure 1:
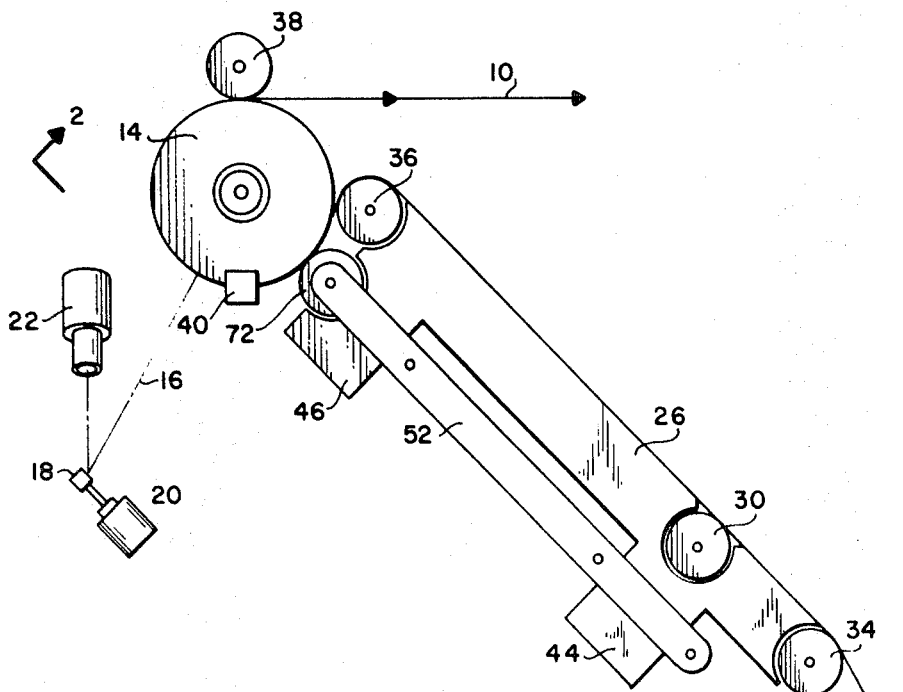
FIG. 1 is a schematic side view illustrating the relative positions of inventive features described herein.

Referring to the drawings and, more particularly, to FIG. 1, the photographic film 10 is fed from the magazine 12 to a rotatable drum 14. The photographic scanning of the photographic film 10 occurs while the film 10 is on the rotatable drum 14. A light beam is moved laterally across the with of the film 10 along a path shown by the broken line 16 in a direction perpendicular to the edge of the film 10 by a rotating mirror 18. The mirror 18 has a plurality of surfaces and is rotated by a suitable motor 20 to deflect the beam from a modulated laser light source 22 along the path 16.

The film transport system also includes a flat plate 24 (see FIG. 2), and a pair of roller supports 26 and 28. A drive roller 30 and a similar drive roller (not shown) interconnected by shaft 32 are mounted on roller supports 26 and 28, respectively. In addition to the drive rollers, rollers 34, 36 and 38 are provided along the path of the photographic film 10. These rollers help to drive the film 10 and are positioned so as to move the film 10 along a desired path.

The new transport system is provided with a first guide member 40. The guide member 40 may be made of a plastic material such as the material identified by the DuPont trademark Delrin, which is a hard, stable, low friction material. Roller support 26 has grooves (see FIG. 1) formed in the extending portions 44 and 46. Similarly roller support 28 has grooves (not shown) formed in extending portions 48 and 50. Guides 52 are mounted for slidable movement within the grooves formed in extending portions 44 and 46. Similarly guides 54 are mounted for slidable movement within the grooves formed in extending portions 48 and 50. Cross bars 56 and 58 interconnect guides 52; cross bars 60 and 62 interconnect guides 54.

Figure 3:
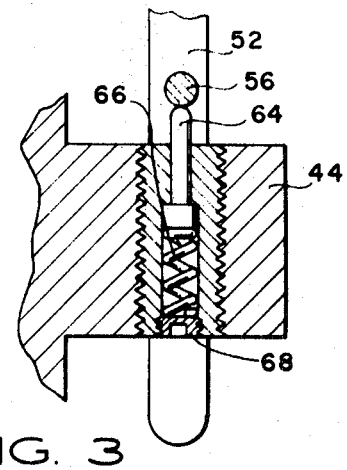
FIG. 3 is a view taken along line 3—3 of FIG. 2.

Plunger 64 is pressed against cross bar 56 by the yieldable coil spring 66 (see FIG. 3). The force of the spring against plunger 64 can be adjusted by means of adjustment screw 68. Movement of guides 52 due to the force of plunger 64 against the cross bar 56 is limited by the contact of cross bar 58 against extending portion 46 of roller support 26.

Structure similar to that shown in FIG. 3 yieldably urges plunger 70 against cross bar 60 to move guides 54. The movement of guides 54 is limited by contact of cross bar 62 with extending portion 50 of roller support 28.

A first guide roller 72 having a helix 74 formed thereon is mounted across the guides 52. A second guide roller 76 having a helix 78 formed thereon is mounted across guides 54 (see FIG. 2). The helices 74 and 78 are kept in yielding contact with the moving photographic film by the spring biased plungers 64 and 70 respectively.

The spiral direction of the helix is formed in opposite progression on each guide roller. The helix will appear as a right-hand thread on one guide roller and as a left-hand thread on the other guide roller. If desired, the pitch of the right-hand helix may be made to differ from the pitch of the left-hand helix.

Helices 74 and 78 are preferably made of a high coefficient of friction material relative to the coefficient of friction of the photographic film to be handled. Urethane and neoprene are examples of suitable material.

Figure 2:
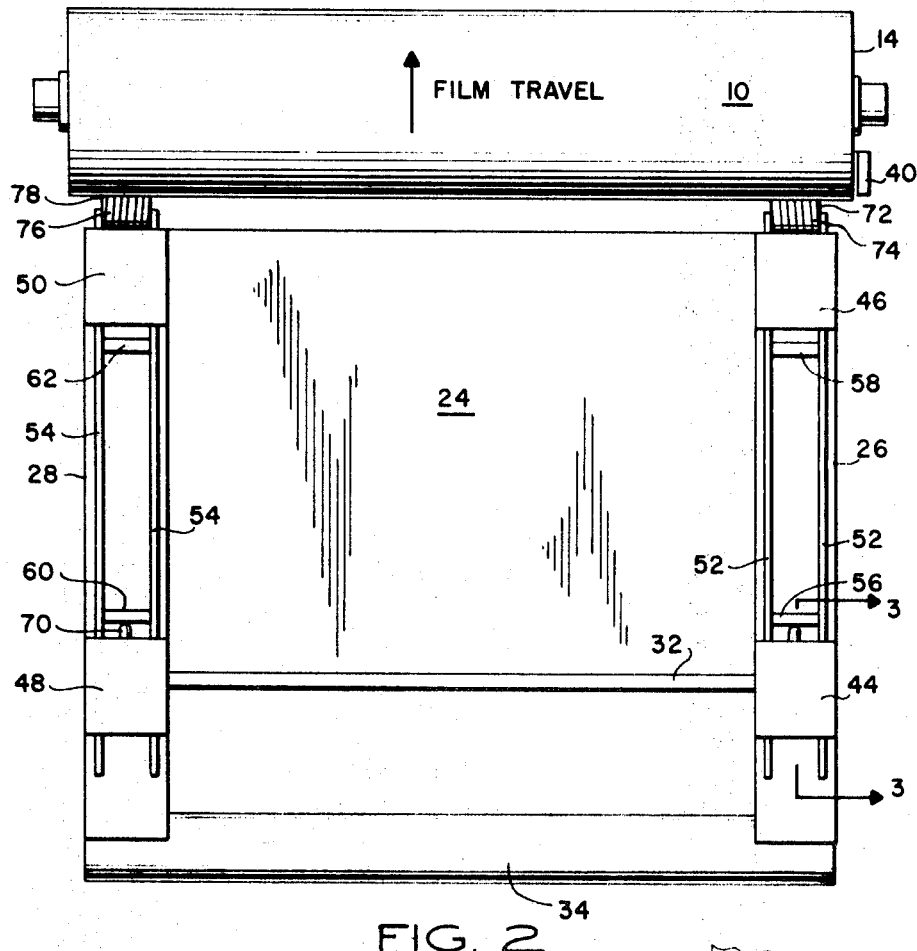
FIG. 2 is a view taken along line 2—2 of FIG. 1.
Figure 4:
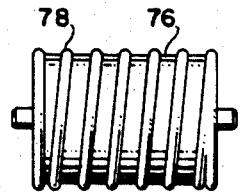
FIG. 4 is an enlarged view of one of the guide rollers.

The advantages of having the frictional material formed in helical patterns 74 and 78 on guide rollers 72 and 76, respectively may be understood by reference to FIG. 2. The spring loaded guide rollers 72 and 76 are urged into contact with film 10 as the film passes around drum 14. Helices 74 and 78 provide sufficient pressure to insure positive film drive in the direction shown.

Helix 74 is formed so that its spiral direction is equivalent to a right-hand thread. During the rolling action of helix 74 as the film 10 passes beneath the roller 72, the small axial compliance of the point of helix contact with film 10 causes the roller 72 to be urged away from the side plate 40. However, the roller 72 is rigidly mounted laterally and restrained from sidewise motion. The compliant frictional surface of helix 74 transfers sidewise thrust to the moving film 10 urging the film toward guide member 40 until the edge of the moving film contacts guide member 40. Thereafter, a steady sidewise thrust maintains the edge of film 10 in constant contact with guide member 40, guiding the film in a true path according to the edge of the film in contact with guide member 40 as is desired.

Guide roller 76 with its helix 78 is similar to guide roller 72 with its helix 74 and is mounted near the opposite edge of the film 10. The helix 78 is formed so as to have a spiral direction equivalent to a left-hand thread and the pitch of helix 78 is less than the pitch of helix 74. A similar sidewise thrust is developed by helix 78 during passage of the film, as described above for helix 74, except the sidewise thrust of helix 78 is less than for helix 74 and is opposite in direction. The opposed sidewise forces applied near the edges of the film 10 result in lateral tensioning of the film insuring that film 10 will lie flat and true on the rotatable drum 14. Furthermore, the smaller sidewise force generated by helix 78 subtracts from the greater and opposite sidewise force of helix 74, leaving the constant difference in magnitude as effective to guide the edge of film 10 steadily and constantly in contact with guide member 40 with the desired net force.

It is important to realize that any wobble in the film will be reflected in the information recorded thereon. It must be remembered that the size of the laser beam is only .005 inch in diameter, and the slightest wobble in the film during a 40 inch sweep of such a small beam, would result in overlapping exposures of the film. This would create confusion and inaccuracies.

An illustrative example of photographic film for use with the data plotter described above is 42 inches in width and 100 feet in length. By providing a one inch margin along each edge of the film, the helices 74 and 78 engage the film only in the margin. This leaves only the weight of the film resting on the rollers 30, 34, 36.

In operation, the photographic film 10 is fed from the magazine 12 over rollers 34, 30, 36, and 38. The helices on the guide rollers 72 and 74 keep one edge of the photographic film 10 always in contact with guide member 40 as data is plotted on the film 10 by the laser beam.

If desired, of course, a single roller can be used with two helices formed on said roller instead of the two rollers as shown. Also without departing from the scope of this invention, the rollers could be placed at a different location along the path of photographic film 10. For example, the guide rollers could be located adjacent the drive rollers 30. Also the helices could be formed on the rotatable drum 14 and ordinary rollers put in place of the rollers with helices thereon.

In the preferred embodiment shown, the predetermined transverse force exerted by each of the helices 74 and 78 is determined by both the force exerted by the adjustable springs and the pitch of each helix. For example, the pitch of helix 74 can be made equal to the pitch of helix 78. Yet a greater transverse force can be exerted by helix 74 than the force exerted by helix 78 simply by adjusting the force of spring 66 to be greater than the force of the spring urging the plunger 70 against cross bar 60. On the other hand, a greater force can be made to be exerted by helix 74 than the force exerted by helix 78 by maintaining the force of spring 66 equal to the force of the spring urging plunger 70 but providing a helix 74 of greater pitch than the pitch of helix 78.

My new transport system may be used for accurately guiding and positioning continuous flexible webs of thin materials other than photographic films. Illustrative examples of such materials are package wrapping films, foils, plastic sheet material and webs of paper.

It is to be understood that various modifications may be made to the described system without departing from the scope of the appended claims.

The embodiments of the invention in which an exclusive property or privilege is claimed are defined as follows:

1. In a transport system for flexible sheet material:
    means for moving the material, such means including a drive roller;
    two guide rollers, each such guide roller having a helix formed thereon made of a high coefficient of friction material relative to the coefficient of friction of the flexible sheet material, the axis of each of said guide rollers being parallel to the axis of the drive roller, the pitch of the helix on one guide roller being greater than the pitch of the helix on the other guide roller and generated in the opposite direction, such helices being adapted to engage the material only adjacent opposite edges along the length of the material; and
    means for frictionally contacting the helices with the moving material.

2. A system in accordance with claim 1, wherein the means for causing the helices to frictionally contact the material includes a yieldable member.

3. A system in accordance with claim 2, wherein the yieldable member is a spring biased plunger.

4. In a transport system for flexible sheet material:
    a rotatable drum,
    means for moving the flexible sheet material around said rotatable drum,
    a guide member mounted adjacent one axial side of the rotatable drum,
    a first guide roller having a helix formed thereon of a high coefficient of friction material relative to the coefficient of friction of the flexible sheet material and having a pitch adapted to force the flexible sheet material toward the guide member, a second guide roller having a helix formed thereon of a high coefficient of friction material relative to the coefficient of friction of the flexible sheet material and having a pitch adapted to force the flexible sheet material away from the guide member, the pitch of said second guide roller being less than the pitch of said first guide roller, and independently adjustable yieldable means for frictionally contacting the helices with the flexible sheet material.

References Cited

UNITED STATES PATENTS

| | | | |
|---|---|---|---|
| 739,781 | 9/1903 | Green | 26—65 |
| 2,995,364 | 8/1961 | Frederick et al. | 271—52 |
| 3,462,053 | 8/1969 | Behr | 26—65X |

ALLEN N. KNOWLES, Primary Examiner

G. A. CHURCH, Assistant Examiner

U.S. Cl. X.R.

26—65; 271—52